United States Patent
Kotani et al.

(10) Patent No.: US 6,345,153 B1
(45) Date of Patent: Feb. 5, 2002

(54) DISTANCE MEASURING EQUIPMENT AND CAMERA

(75) Inventors: Takaaki Kotani; Shuichi Ishii; Seimei Ushiro, all of Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/627,297

(22) Filed: Jul. 27, 2000

(30) Foreign Application Priority Data

Jul. 30, 1999 (JP) .......................................... 11-216480
Jul. 5, 2000 (JP) .......................................... 12-203235

(51) Int. Cl.$^7$ .......................... G03B 13/00; G02B 7/28; G02B 7/099; G01C 3/00
(52) U.S. Cl. ........................ 396/106; 396/120; 356/3.04
(58) Field of Search ................................ 396/106, 120; 356/3.04

(56) References Cited

U.S. PATENT DOCUMENTS

| 4,849,781 A | * | 7/1989 | Nakazawa et al. ........... 396/120 |
| 5,614,984 A | * | 3/1997 | Seki et al. ................... 396/106 |
| 6,188,843 B1 | * | 2/2001 | Yoshida ....................... 396/106 |

FOREIGN PATENT DOCUMENTS

| JP | 04-048208 | 2/1992 | |
| JP | 5-18745 | 1/1993 | ............ G01C/3/06 |
| JP | 07-260475 | 10/1995 | |

OTHER PUBLICATIONS

Patent Abstract of Japan 05018745 Jan. 26, 1993.

* cited by examiner

Primary Examiner—David M. Gray
Assistant Examiner—Rochelle Blackman
(74) Attorney, Agent, or Firm—Sughrue Mion, PLLC

(57) ABSTRACT

There are disclosed a distance measuring equipment capable of performing a distance measurement with greater accuracy suppressing cost up, and a camera. In case of the short distance area and the middle distance area, switches 61 and 62 are set up to the turn-off state, and switch 63 is set up to take the contact 63a side, so that photo-current signals $I_1$ and $I_2$ from PSD 30 are fed to input terminals 41 and 42 to perform a usual ratio arithmetic processing. In case of the long distance area, the switches 61 and 62 are set up to the turn-off state and the turn-on state, respectively, and the switch 63 is set up to take the contact 63b side, so that photo-current signal the $I_1$ and fixed current signal $I_r$ are fed to the input terminals 41 and 42 to perform a ratio arithmetic processing based on the fixed current signal. In case of the longest distance area, the switches 61 and 62 are set up to the turn-on state and the turn-off state, respectively, and the switch 63 is set up to take the contact 63b side to form a first signal transmission path, so that an addition value of the photo-current signals $I_1$ and $I_2$ and the fixed current signal $I_r$ are fed to the input terminals 41 and 42 to perform a ratio arithmetic processing based on light quantity to determine focusing data.

18 Claims, 10 Drawing Sheets

DISTANCE MEASURING EQUIPMENT AND CAMERA

BACKGROUND OF THE INVENTION

1. Field of the Invention

The present invention relates to a distance measuring equipment for measuring a distance up to a target to be measured in distance in such a manner that light is projected and light reflected on the target and returned is detected, and a camera incorporated thereinto such a distance measuring equipment.

2. Description of the Related Art

Hitherto, there is widely spread a camera incorporating thereinto an automatic focusing (AF) device, which is generally referred to as an active type. Such an active type of automatic focusing device adopts a system for measuring a distance up to a camera subject in such a manner that an AF light projection unit and an AF photo detection unit are disposed at intervals of a predetermined base length, light is projected from the AF light projection unit to the camera subject, and light reflected on the camera subject is detected by the AF photo detection unit.

As a photo detector element for focusing, for example, a PSD element, is used. As an arithmetic device for performing an arithmetic processing in accordance with photo-current from the PSD element, for example, there is used an AF-dedicated photo detector IC for performing a ratio arithmetic processing.

To perform a photography using such a camera, first, a shutter button is subjected to a half-push operation. Then, light for focusing is projected from the AF light projection unit ahead of the camera, and light for focusing, which is reflected on the camera subject and returned, is detected on a detection surface of the PSD element so that a photo-current is generated. The photo-current thus generated is separated into two photo-currents (a photo-current at the short distance side and a photo-current at the long distance side) in accordance with the respective distances between a projection position on the detection surface of the PSD element and both ends of the detection surface. And signals representative of those two photo-currents are fed to the AF-dedicated photo detector IC. In the AF-dedicated photo detector IC, a ratio arithmetic processing is performed in accordance with the signals representative of those two photo-currents. A distance up to the camera subject is determined in accordance with a result of the ratio arithmetic processing, and an image taking lens is moved to the distance thus determined. In this manner, a focusing is performed, and then the shutter button is subjected to a full-push operation to perform a photography.

Generally, as a distance up to the camera subject is far, a photo-current from the PSD element is smaller. Thus, S/N ratio of a signal representative of a photo-current, particularly a signal of a long distance side, is lowered, and it is difficult to exactly determine the distance up to the camera subject by the AF-dedicated photo detector IC.

In view of the foregoing, Japanese Patent Application Laid Open Gazette Hei.4-48208 discloses a technology of enhancing accuracy in focusing for both the short distance and the long distance in such a manner that in case of the short distance for the camera subject, values wherein ratio arithmetic values of the photo-currents outputted from the PSD element are integrated by a predetermined number of times, are given as focusing data, and in case of the long distance for the camera subject, values wherein addition values (light quantity) of the photo-currents outputted from the PSD element are integrated by a predetermined number of times, are given as focusing data.

Further, in view of the foregoing, Japanese Patent Application Laid Open Gazette Hei.7-260475 discloses a technology of enhancing accuracy in focusing for both the short distance and the long distance in such a manner that control data, which are different for each camera, are written beforehand, and the optimum short distance side signal and long distance side signal are determined in such a way that the control data are utilized, when a focusing program is effected, to equally operate first and second amplifiers connected to a pair of output terminals of a PSD element, so that that the short distance side signal and the long distance side signal are fed to ports of a microcomputer for controlling a camera to perform an arithmetic operation.

However, according to the technology proposed in Japanese Patent Application Laid Open Gazette Hei.4-48208, there are individually needed a circuit for computing addition values and a circuit for computing ratio arithmetic values, and thus a circuit scale of a photo detector is enlarged. This causes the cost of the equipment or the device to be increased.

According to the technology proposed in Japanese Patent Application Laid Open Gazette Hei.7-260475, there is associated with such a problem that the number of input ports of the microcomputer is increased.

In view of the foregoing, it is considered that an AF-dedicated photo detector IC, which is capable of performing both the ratio arithmetic processing and the operating processing based on light quantity, is developed to adopt the same. In this case, however, it takes much cost for a development of the new IC per se. And in addition, the development of the new IC cannot bring about a merit in low cost caused by a mass production of the AF-dedicated photo detector IC performing only the ratio arithmetic processing. Thus, also in this case, there is associated with such a problem that the cost is increased.

This problem occurs also in the event that an SPD element having a divided detection surface is used as a photo detector for focusing, not restricted to a case where a PSD element is used as the photo detector for focusing.

SUMMARY OF THE INVENTION

In view of the foregoing, it is an object of the present invention to provide a distance measuring equipment capable of performing focusing with greater accuracy, suppressing the cost up, and a camera incorporating thereinto such a distance measuring equipment.

To achieve the above-mentioned object, the present invention provides a distance measuring equipment for measuring a distance up to a target to be measured in distance in such a manner that light is projected and light reflected on the target and returned is detected, said distance measuring equipment comprising:

- a semiconductor photo detector element having a detection surface generating a photo-current upon receipt of irradiation of light;
- a ratio arithmetic circuit, having two input terminals each for receiving associated one of current signals, for performing a ratio arithmetic operation in accordance with the current signals fed from the two input terminals;
- a current source for generating fixed current signal; and
- a first signal transmission path wherein the photo-current obtained through irradiation of light onto the detection surface of said semiconductor photo detector is lead to one input terminal of the two input terminals of said ratio arithmetic circuit and the fixed current signal from said current source to another input terminal of the two input terminals of said ratio arithmetic circuit.

According to the distance measuring equipment of the present invention, the photo-current generated on the detection surface of the semiconductor photo detector is fed to one input terminal of the two input terminals of the ratio arithmetic circuit, and the fixed current signal is fed to another input terminal of the two input terminals of said ratio arithmetic circuit, so that a ratio arithmetic processing is performed. This feature makes it possible to perform an arithmetic operation based on light quantity through adopting an algorithm referred to as a ratio arithmetic operation as it is. That is, it is possible to perform an arithmetic operation based on light quantity through adopting the conventional ratio arithmetic circuit as it is.

In the distance measuring equipment according to the present invention as mentioned above, it is preferable that said current source generates fixed current signal of an optional current value.

The use of such a current source makes it possible to control the focusing characteristic representative of a result of a ratio arithmetic operation in the ratio arithmetic circuit, since the value of the fixed current signal to be fed to the ratio arithmetic circuit can be selected.

In the distance measuring equipment according to the present invention as mentioned above, it is acceptable that said semiconductor photo detector element comprises a plurality of signal electrodes for outputting on a share basis the photo-current generated on said detection surface, and said first signal transmission path leads photo-currents outputted on a share basis from said plurality of signal electrodes to said one input terminal.

In this case, it is acceptable that said semiconductor photo detector element comprises said detection surface, and a pair of signal electrodes, disposed at both ends of said detection surface, adapted for outputting on a share basis the photo-current generated by irradiation of light onto said detection surface in accordance with respective distances between an irradiation position on said detection surface and both ends of said detection surface.

Alternatively, in the distance measuring equipment according to the present invention as mentioned above, it is acceptable that said semiconductor photo detector element comprises said detection surface, a pair of signal electrodes, disposed at both ends of said detection surface, adapted for outputting on a share basis the photo-current generated by irradiation of light onto said detection surface, and a first switch, disposed at a position adjacent to one signal electrode which is one of said pair of signal electrodes, for selectively offering a first state which permits the photo-current generated on said detection surface to conduct into said one signal electrode, and a second state which inhibits the photo-current generated on said detection surface from conducting into said one signal electrode, in accordance with a control signal, and said first signal transmission path leads, when said first switch offers said second state, the photo-current outputted from another signal electrode different from said one signal electrode of said pair of signal electrodes to said one input terminal.

In this case, it is preferable that in said semiconductor photo detector element, when said first switch is in the first state, said pair of signal electrodes output on a share basis the photo-currents generated by irradiation of light onto said detection surface in accordance with respective distances between an irradiation position of the light on said detection surface and both the ends of the detection surface.

Alternatively, in the distance measuring equipment according to the present invention as mentioned above, it is acceptable that said semiconductor photo detector element comprises said detection surface, signal electrodes, connected to associated divided areas of said detection surface, respectively, adapted for outputting the photo-current generated by irradiation of light onto said detection surface, and a second switch, disposed at a boundary between divided areas of said detection surface, for selectively offering a first state which permits the photo-current generated on said detection surface to conduct through the associated boundary, and a second state which inhibits the photo-current generated on said detection surface from conducting through the associated boundary, in accordance with a control signal, and said first signal transmission path leads, when said second switch offers said first state, the photo-current outputted from the signal electrodes on a share basis to said one input terminal.

Or alternatively, in the distance measuring equipment according to the present invention as mentioned above, it is acceptable that said semiconductor photo detector element comprises said detection surface, signal electrodes, connected to associated divided areas of said detection surface, respectively, adapted for outputting the photo-current generated by irradiation of light onto said detection surface, a second switch, disposed at a boundary between divided areas of said detection surface, for selectively offering a first state which permits the photo-current generated on said detection surface to conduct through the associated boundary, and a second state which inhibits the photo-current generated on said detection surface from conducting through the associated boundary, in accordance with a control signal, and a third switch, provided in association with another signal electrode excepting a first signal electrode which is one of said signal electrodes, for selectively offering a first state which permits the photo-current generated on said detection surface to conduct into the associated signal electrode, and a second state which inhibits the photo-current generated on said detection surface from conducting into the associated signal electrode, in accordance with a control signal, and said first signal transmission path leads, when said third switch offers said second state, while said second switch offers said first state, the photo-current outputted from the first signal electrode to said one input terminal.

In the distance measuring equipment according to the present invention as mentioned above, said first state is, for example, a low impedance state, and said second state is, for example, a high impedance state. However, those states are not always related to high impedance and low impedance. The first state implies a state in which it is permitted that the photo-current conducts through the switch. The second state implies a state in which it is prohibited that the photo-current conducts through the switch.

In the distance measuring equipment according to the present invention as mentioned above, it is preferable that said semiconductor photo detector element has a plurality of signal electrodes adapted for outputting on a share basis the photo-current generated on said detection surface, and distance measuring equipment further comprises a transmission path selecting unit for changing over between said first signal transmission path and a second signal transmission path for leading two types of photo-currents outputted from two signal electrodes of the plurality of signal electrodes of said semiconductor photo detector element to the two input terminals of said ratio arithmetic circuit, respectively.

The adoption of the transmission path selecting unit makes it possible to perform a ratio arithmetic processing based on the total of a plurality of photo-currents through changing over to the first signal transmission path, and also possible to perform the conventional ratio arithmetic processing through changing over to the second signal transmission path.

In the distance measuring equipment according to the present invention as mentioned above, it is preferable that said semiconductor photo detector element has a plurality of signal electrodes adapted for outputting on a share basis the photo-current generated on said detection surface, and distance measuring equipment further comprises a transmission path selecting unit for changing over between said first signal transmission path and a third signal transmission path for leading one photo-current of a plurality of photo-currents outputted from the plurality of signal electrodes of said semiconductor photo detector element to one of the two input terminals of said ratio arithmetic circuit, and for leading a fixed current signal from said current source to another input terminal of the two input terminals of said ratio arithmetic circuit.

In some distance up to the target to be measured or some structure of the semiconductor photo detector element, it happens that an optionally selection of one of the signals representative of photo-currents outputted from the photo detector elements makes it possible to effectively expect an improvement of a performance. In such a case, the transmission path selecting unit is used to change over to the third signal transmission path so that the ratio arithmetic processing with the fixed current signal is performed. This feature makes it possible to enhance an accuracy of focusing in the distance area.

Further, in the distance measuring equipment according to the present invention as mentioned above, it is preferable that said semiconductor photo detector element has a plurality of signal electrodes adapted for outputting on a share basis the photo-current generated on said detection surface, and distance measuring equipment further comprises a transmission path selecting unit for changing over between said first signal transmission path, a second signal transmission path for leading two types of photo-currents outputted from two signal electrodes of the plurality of signal electrodes of said semiconductor photo detector element to the two input terminals of said ratio arithmetic circuit, respectively, and a third signal transmission path for leading one photo-current of a plurality of photo-currents outputted from the plurality of signal electrodes of said semiconductor photo detector element to one of the two input terminals of said ratio arithmetic circuit, and for leading a fixed current signal from said current source to another input terminal of the two input terminals of said ratio arithmetic circuit.

An adoption of the transmission path selecting unit makes it possible to measure a distance with greater accuracy over the wide distance range. For example, according to the embodiments which will be described later, in the event that the target to be measured in distance is in a sufficiently long distance area, a ratio arithmetic processing based on the light quantity is performed through changing over to the first signal transmission path, in the event that the target to be measured in distance is in a short distance area, the conventional ratio arithmetic processing is performed through changing over to the second signal transmission path, and in the event that the target to be measured in distance is in a slightly long distance area, a ratio arithmetic processing based on the fixed current signal is performed through changing over to the third signal transmission path.

To achieve the above-mentioned object, the present invention provides a camera having a distance measuring equipment for projecting light for focusing in front of the camera and detecting light reflected on a subject to determine a distance up to the subject, said distance measuring equipment moving an image taking lens to the determined distance for photography, wherein said distance measuring equipment comprises:

a semiconductor photo detector element having a detection surface generating a photo-current upon receipt of irradiation of light;

a ratio arithmetic circuit, having two input terminals each for receiving associated one of current signals, for performing a ratio arithmetic operation in accordance with the current signals fed from the two input terminals;

a current source for generating fixed current signal; and a first signal transmission path wherein the photo-current obtained through irradiation of light onto the detection surface of said semiconductor photo detector is lead to one input terminal of the two input terminals of said ratio arithmetic circuit and the fixed current signal from said current source to another input terminal of the two input terminals of said ratio arithmetic circuit.

In the camera according to the present invention as mentioned above, it is preferable that said semiconductor photo detector element has a plurality of signal electrodes adapted for outputting on a share basis the photo-current generated on said detection surface, and distance measuring equipment further comprises a transmission path selecting unit for changing over between said first signal transmission path and a second signal transmission path for leading two types of photo-currents outputted from two signal electrodes of the plurality of signal electrodes of said semiconductor photo detector element to the two input terminals of said ratio arithmetic circuit, respectively.

In the camera according to the present invention as mentioned above, it is preferable that said semiconductor photo detector element has a plurality of signal electrodes adapted for outputting on a share basis the photo-current generated on said detection surface, and distance measuring equipment further comprises a transmission path selecting unit for changing over between said first signal transmission path and a third signal transmission path for leading one photo-current of a plurality of photo-currents outputted from the plurality of signal electrodes of said semiconductor photo detector element to one of the two input terminals of said ratio arithmetic circuit, and for leading a fixed current signal from said current source to another input terminal of the two input terminals of said ratio arithmetic circuit.

Further, in the camera according to the present invention as mentioned above, it is preferable that said semiconductor photo detector element has a plurality of signal electrodes adapted for outputting on a share basis the photo-current generated on said detection surface, and distance measuring equipment further comprises a transmission path selecting unit for changing over between said first signal transmission path, a second signal transmission path for leading two types of photo-currents outputted from two signal electrodes of the plurality of signal electrodes of said semiconductor photo detector element to the two input terminals of said ratio arithmetic circuit, respectively, and a third signal transmission path for leading one photo-current of a plurality of photo-currents outputted from the plurality of signal electrodes of said semiconductor photo detector element to one of the two input terminals of said ratio arithmetic circuit, and for leading a fixed current signal from said current source to another input terminal of the two input terminals of said ratio arithmetic circuit.

It is noted that cameras provided with various types of distance measuring equipment as mentioned above are included in a camera of the present invention.

DETAILED DESCRIPTION OF PREFERRED EMBODIMENTS

Embodiments of the present invention will be described with reference to the accompanying drawings.

Figure 1:
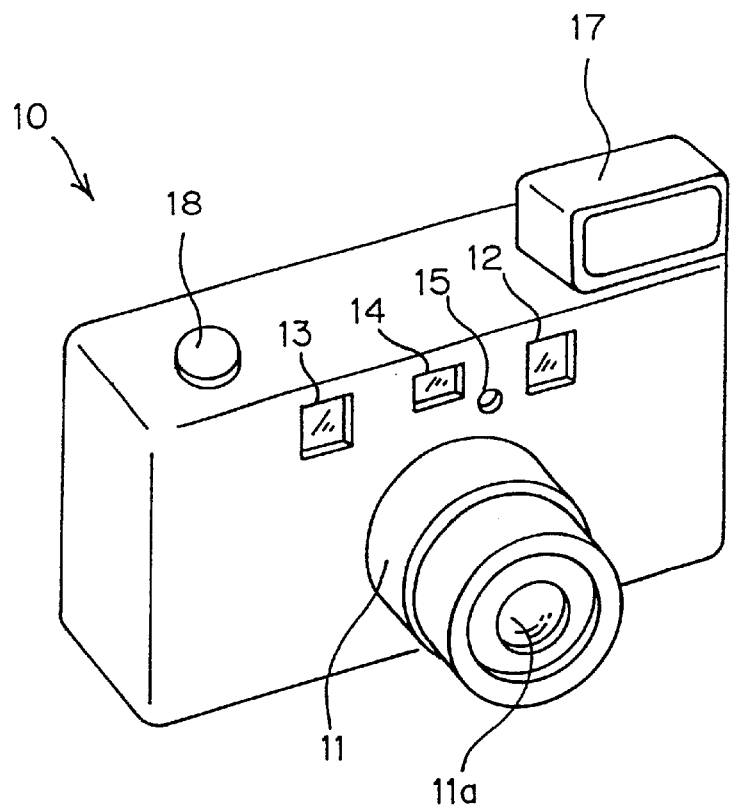
FIG. 1 is a perspective view of a camera according to an embodiment of the present invention, looking obliquely upper from the front.

FIG. 1 is a perspective view of a camera according to an embodiment of the present invention, looking obliquely upper from the front.

A camera 10 shown in FIG. 1 incorporates therein an automatic focusing (AF) device generally referred to as an active type, and is for performing a photography on a roll-like shaped photographic film. The AF device incorporated in the camera corresponds to an embodiment of a distance measuring equipment of the present invention.

At the front central portion of the camera 10, there is provided a zoom barrel 11 in which an optical zoom lens 11a is built.

The automatic focusing device comprises a light projecting unit, having an AF light projection window 12 disposed at the front upper portion of the camera 10, for projecting light for focusing from the AF light projection window 12 in front of the camera 10, and a photo detector unit, having an AF light detection window 13 disposed at the front portion of the camera 10 and at an interval of a predetermined distance from the AF light projection window 12, for determining a distance up to a camera subject in such a manner that light is projected from the AF light projection window 12 in front of the camera 10, and light reflected on the camera subject is detected through the AF light detection window 13. The photo detector unit is provided with a PSD, which is a kind of semiconductor photo detector element referred to in the present invention, disposed behind the AF light detection window 13. The photo detector unit will be described in detail later.

The camera 10 is further provided with a finder window 14 constituting a finder unit (not illustrated) and an AE detection window 15 for leading light to an internal AE sensor for an exposure adjustment. Further, on the top of the camera 10, there are provided a pop-up electronic flash light emission unit 17 and a shutter button 18.

Figure 2:
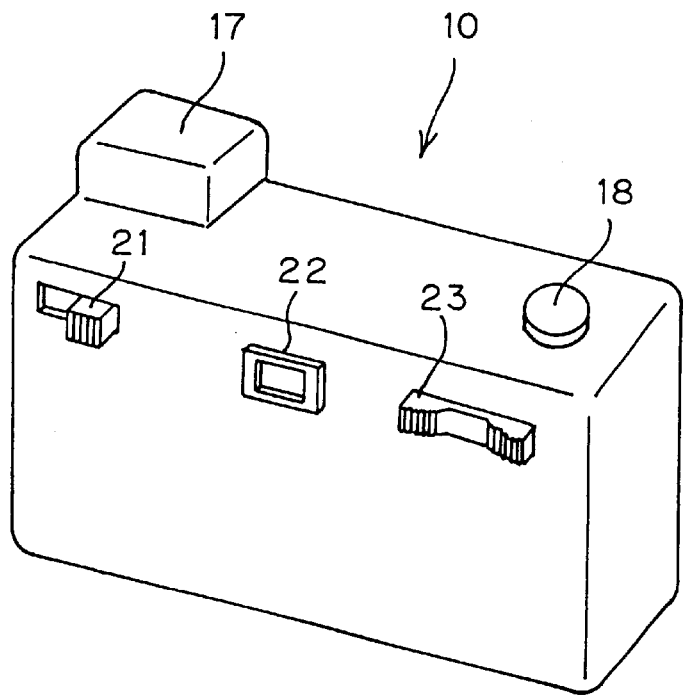
FIG. 2 is a perspective view of the camera shown in FIG. 1, looking obliquely upper from behind.

FIG. 2 is a perspective view of the camera shown in FIG. 1, looking obliquely upper from behind.

On the back of the camera 10, there is provided an electronic flash on/off switch 21 for selecting whether the electronic flash device is to be operated at the time of photography, a finder eyepiece window 22 and a zoom operating lever 23 for operating the optical zoom lens 11a to a tele-side (a long distance side) or a wide-side (a short distance side).

The camera 10 thus constructed is improved in accuracy of focusing, and is small in a circuit scale and reduced in cost. Hereinafter, details of the camera 10 will be described.

Figure 3:
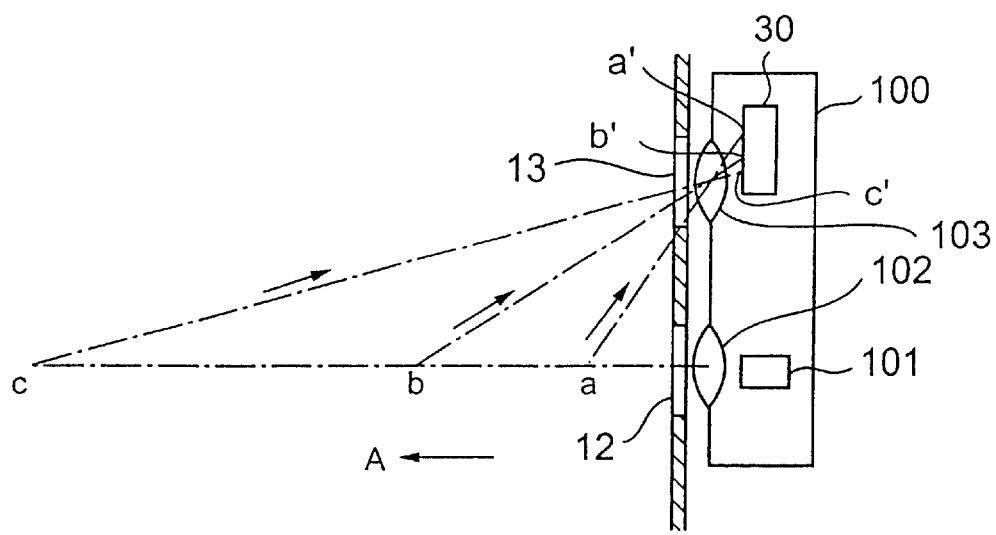
FIG. 3 is a typical illustration of an optical system of an automatic focusing device of the camera shown in FIG. 1.

FIG. 3 is a typical illustration of an optical system of an automatic focusing device of the camera shown in FIG. 1.

The camera 10 shown in FIG. 1 is provided with an AF unit 100. The AF unit 100 is provided with an LED 101, which is a light emitting diode for light projection disposed at the back of the AF light projection window 12 of the camera 10, and a projection lens 102 for narrowing a light beam emitted from the LED 101 down. At the back of the AF light detection window 13 of the camera 10, there is disposed a PSD 30, which is a kind of semiconductor photo detector element, and a photo detection lens 103 for condensing on the PSD 30 light emitted from the LED 101 and reflected on a camera subject (not illustrated).

Light for photometry emitted from the LED 101 travels via the projection lens 102 and the AF light projection window 12 forward (in an arrow A direction), and reflects on the camera subject (not illustrated). Incident light from the AF light detection window 13, of the reflected light, is condensed on the PSD 30 via the photo detection lens 103. Here, in the event that the camera subject is at a point a, light reflected on the point a is condensed on a point a' of the PSD 30. In the event that the camera subject is at a point b, light reflected on the point b is condensed on a point b' of the PSD 30, which is different from the point a'. In the event that the camera subject is at a point c, light reflected on the point c is condensed on a point c' of the PSD 30, which is different from the points a' and b'. In this manner, the condensing point on the PSD 30 is varied in accordance with a distance of the camera subject from the camera 10. Consequently, it is possible to determine a distance of the camera subject through detecting a position of the condensing point. The camera according to the present embodiment adopts a focusing according to this principle, when the camera subject is at the relatively short distance, as will be described later.

Further, while there exists an error due to a difference of a reflectance of the camera subject, when the camera subject is at the short distance, the strong light will be returned onto the PSD 30. On the other hand, when the camera subject is at the long distance, only the relatively weak light will be returned onto the PSD 30. Consequently, it is possible to determine a distance of the camera subject also through detecting on the PSD 30 the intensity (light quantity) of the light emitted from the LED 101 and reflected on the camera subject. The camera according to the present embodiment adopts a focusing according to this principle, when the camera subject is at the relatively long distance, as will be described later.

Figure 4:
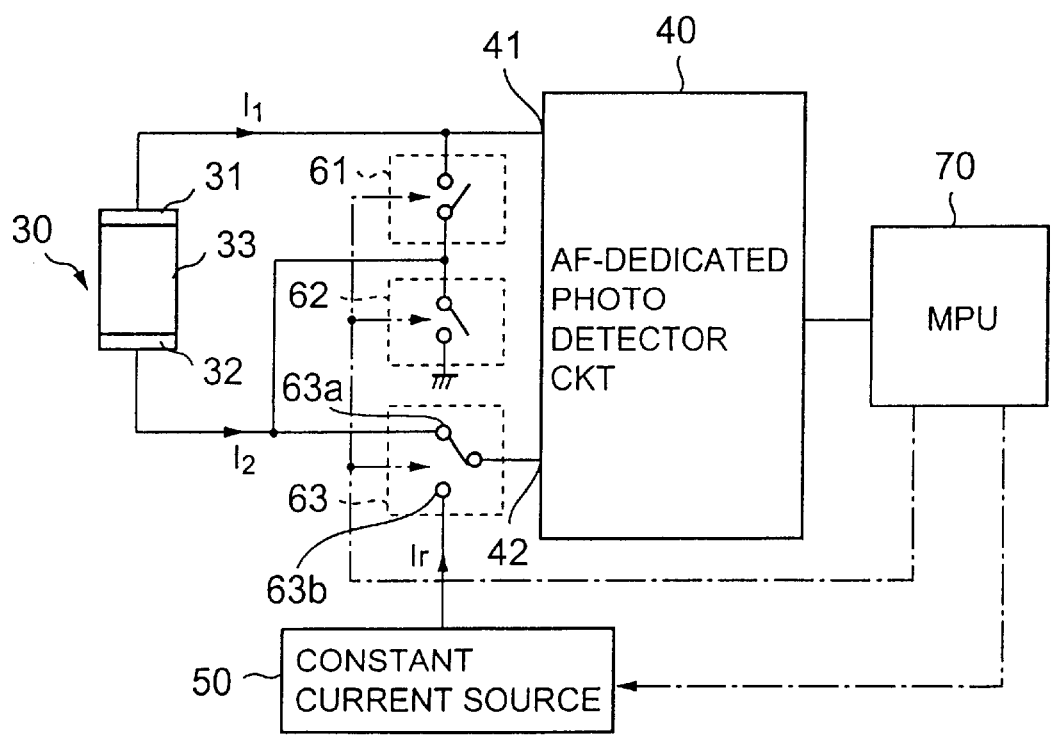
FIG. 4 is a circuit diagram of a photo detector unit of the camera shown in FIG. 1.
Figure 5:
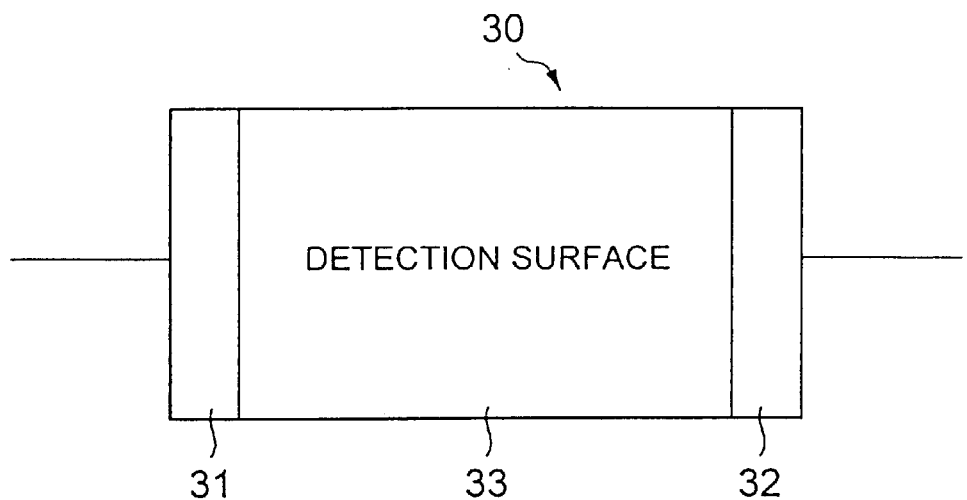
FIG. 5 is a typical illustration of a PSD element shown in FIGS. 3 and 4.

FIG. 4 is a circuit diagram of a photo detector unit of the camera shown in FIG. 1. FIG. 5 is a typical illustration of the PSD shown in FIGS. 3 and 4.

A photo detector unit, as shown in FIG. 4, comprises the PSD 30, an AF-dedicated photo detector circuit 40, a constant current source 50, and switch elements 61, 62 and 63, and an MPU 70.

The PSD 30, as shown in FIG. 5, comprises a detection surface 33 for generating a photo-current upon receipt of irradiation of light, and a pair of signal electrodes 31 and 32, provided at both ends of the detection surface 33, respectively, for outputting the photo-current generated by irradiation of light onto the detection surface 33 on a shared basis in accordance with the respective distances between an irradiation position of the light on the detection surface 33 and both the ends of the detection surface 33.

The AF-dedicated photo detector circuit 40, which corresponds to the ratio arithmetic circuit, performs a ratio arithmetic operation in accordance with two types of photo-current obtained through a pair of electrodes 41 and 42, so that a distance up to a camera subject is determined.

The constant current source 50 generates a constant current which is variable in a current value, and outputs constant current $I_r$ of the current value designated by MPU 70.

The switch elements 61 and 62 are changed over to a turn-on state or a turn-off state in accordance with control signals from the MPU 70. The switch element 63 is changed over to a contact 63a side or a contact 63b side in accordance with a control signal from the MPU 70. The switch elements 61, 62 and 63 correspond to examples of the transmission path selecting unit referred to in the present invention.

The MPU 70 sets up a current value of a constant current to be outputted from the constant current source 50 and changes over the switch elements 61, 62 and 63. Details of the MPU 70 will be described later.

Figure 6:
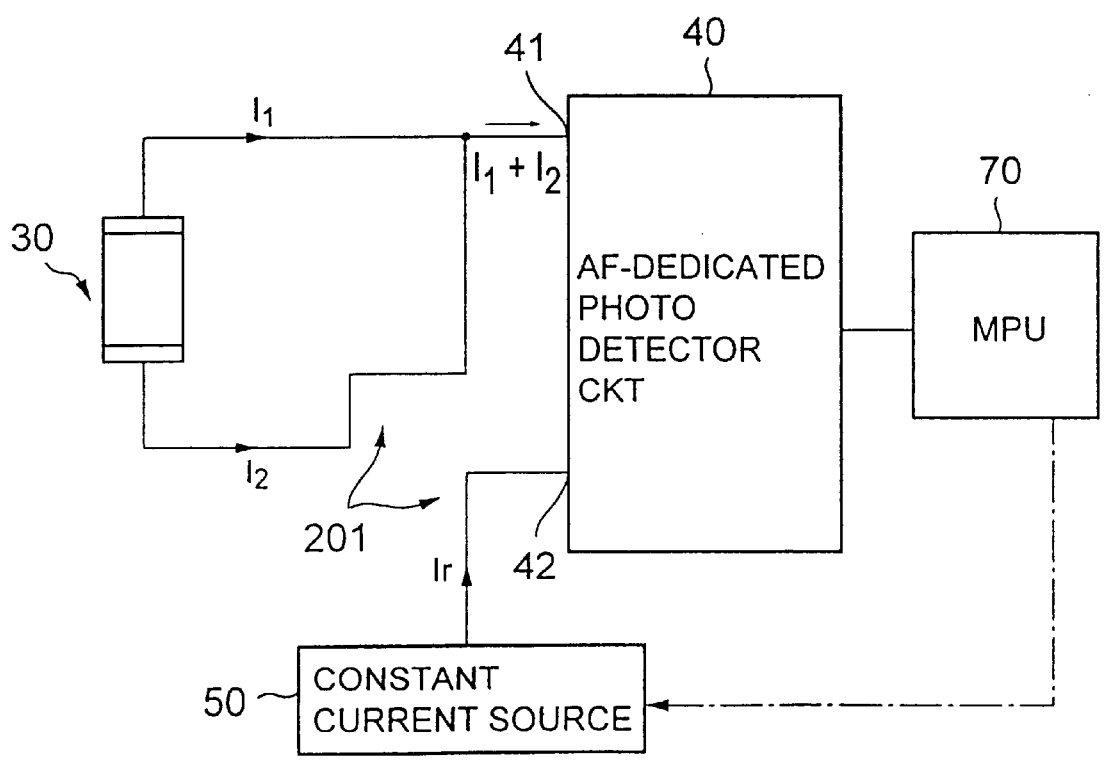
FIG. 6 is a first signal transmission path in an AF section shown in FIG. 4.
Figure 7:
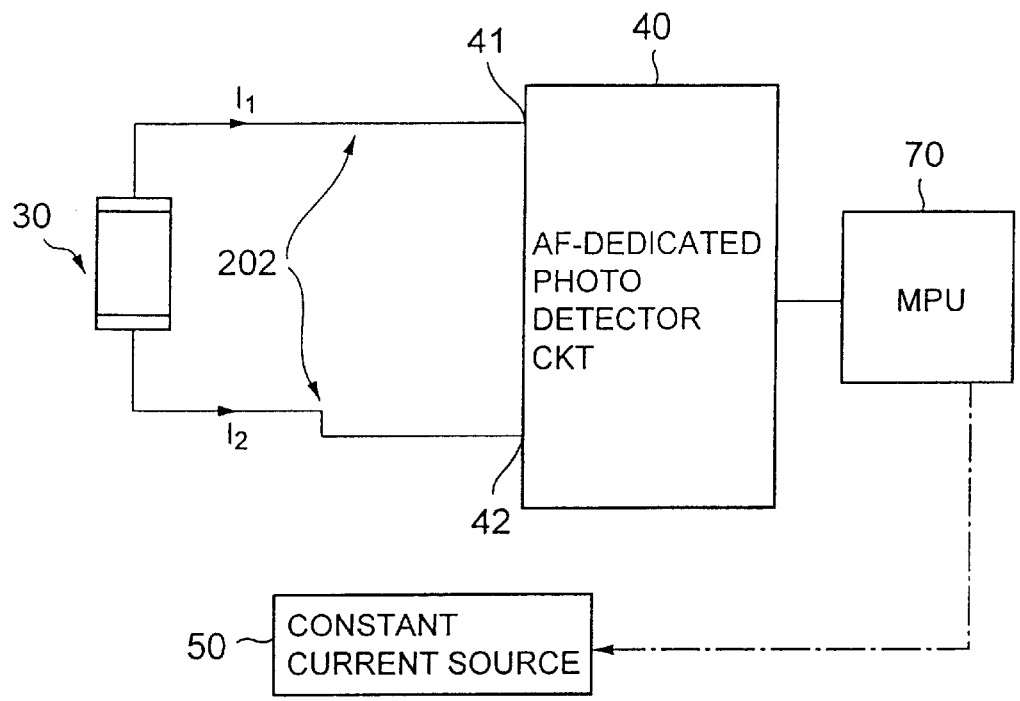
FIG. 7 is a second signal transmission path in an AF section shown in FIG. 4.
Figure 8:
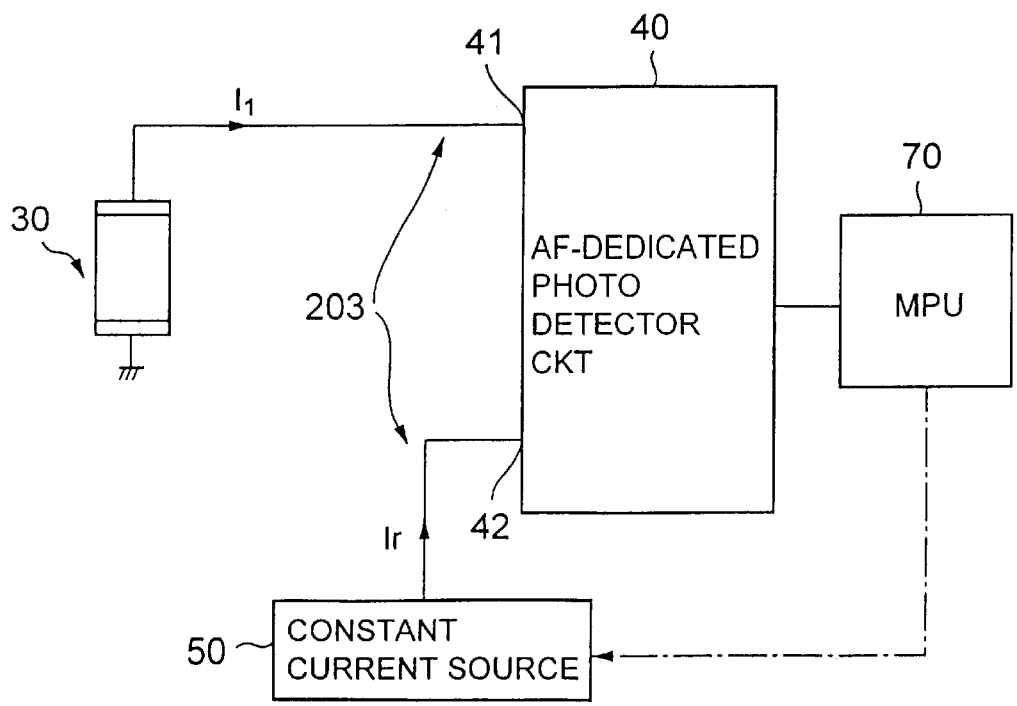
FIG. 8 is a third signal transmission path in an AF section shown in FIG. 4.

FIG. 6 is a first signal transmission path in an AF section shown in FIG. 4. FIG. 7 is a second signal transmission path in an AF section shown in FIG. 4. FIG. 8 is a third signal transmission path in an AF section shown in FIG. 4.

In the event that the MPU 70 changes over the switch elements 61, 62 and 63, as shown in FIG. 4, in such a manner that the switch element 61 turns on, the switch element 62 turns off and the switch element 63 is changed over to the contact 63b side, a first signal transmission path 201 shown in FIG. 6 is implemented. The first signal transmission path 201 leads both two current signals $I_1$ and $I_2$ outputted from a pair of signal electrodes 31 and 32 of the PSD 30 to one input terminal 41 of the pair of electrodes 41 and 42 of the AF-dedicated photo detector circuit 40, and also leads the fixed current signal $I_r$ from the constant current source 50 to another input terminal 42 of the pair of electrodes 41 and 42 of the AF-dedicated photo detector circuit 40.

In the event that the MPU 70 changes over the switch elements 61, 62 and 63 in such a manner that both the switch elements 61 and 62 turn off and the switch element 63 is changed over to the contact 63a side, a second signal transmission path 202 shown in FIG. 7 is implemented. The second signal transmission path 202 leads two current signals $I_1$ and $I_2$ outputted from a pair of signal electrodes 31 and 32 of the PSD 30 to the electrodes 41 and 42 of the AF-dedicated photo detector circuit 40, respectively.

In the event that the MPU 70 changes over the switch elements 61, 62 and 63 in such a manner that the switch element 61 turns off, the switch element 62 turns on and the switch element 63 is changed over to the contact 63b side, a third signal transmission path 203 shown in FIG. 8 is implemented. The third signal transmission path 203 leads one current signal $I_1$ of the two current signals $I_1$ and $I_2$ outputted from a pair of signal electrodes 31 and 32 of the PSD 30 to the input terminal 41 of the AF-dedicated photo detector circuit 40, and also leads the fixed current signal $I_r$ from the constant current source 50 to the input terminal 42 of the AF-dedicated photo detector circuit 40.

Next, there will be explained a focusing algorithm in the camera 10.

As a data arithmetic procedure for an active type of automatic focusing (AF) device, a ratio arithmetic procedure is well known.

In the ratio arithmetic procedure, the following expression is given.

$$R=N/(N+F) \text{ or } R=F/(N+F) \tag{1}$$

Where R denotes output data, N: a short distance side signal, and F: a long distance side signal.

With respect to this R, a relation of $R=\alpha \times (1/L)$ applies for the subject distance L, where $\alpha$ is determined in accordance with the AF system.

On the other hand, in the event that the long distance side signal F is fixed on the signal C, and the short distance side signal N is replaced by P=(N+F) which denotes a total value of N and F in the formula (1), from the formula (1), $$R'=P/(P+C) \text{ or } R'=C/(P+C) \tag{2}$$

is outputted in form of the arithmetic result.

Here, in the event that a total value (N+F) of N and F in case of a specific distance $L_0$ is given by $P_0$, and R' determined in accordance with equation (2) is given by $R_0$, the following expression is given.

$$P_0=R_0 \times C/(1-R_0) \text{ or } P_0=(1-R_0) \times C/R_0 \tag{3}$$

With respect to an arbitrary distance L and the associated total value P, $$P = P_0 \times (L_0/L)^2 \quad (4)$$

is established.

From equations (2) and (4), the distance L is expressed through P by R' as follows:

$$L = \sqrt{\{(1-R') \times P_0/(R' \times C)\} \times L_0}$$

Or $$L = \sqrt{\{R' \times P_0/((1-R') \times C)\} \times L_0} \quad (5)$$

With respect to the distance L, a derivation method, which is the same as the ratio arithmetic processing, is used to derive focusing data from light quantity P.

According to the present embodiment, there are used three types of focusing algorithm. Of the three types of focusing algorithm, the first focusing algorithm relates to a focusing algorithm of calculating a distance according to the irradiation position on the detection surface of the PSD element 30. More in detail, according to the first focusing algorithm, both the switch elements 61 and 62 are changed over to the turn-off state, and the switch element 63 is changed over to the contact 63a side, so that the second signal transmission path 202 shown in FIG. 7 is selected, and a ratio arithmetic processing $\{I_1/(I_1+I_2)\}$ for the photo-currents $I_1$, $I_2$ from the PSD element 30 is performed in accordance with the formula (1). The first focusing algorithm is applied to the focusing for the short distance area and the middle distance area, which will be described later.

The second focusing algorithm relates to a focusing algorithm wherein the switch elements 61 and 62 are changed over to the turn-off state and the turn-on state, respectively, and the switch element 63 is changed over to the contact 63b side, so that the third signal transmission path 203 shown in FIG. 8 is selected, and a ratio arithmetic processing $\{I_1/(I_1+I_r)\}$ for the photo-current $I_1$ from the PSD element 30 and the constant current $I_r$ from the constant current source 50 is performed in accordance with the formula (1). In this case, however, while the operation is performed in accordance with the formula (1), the long distance side signal F in the formula (1) is replaced by the fixed signal C represented by the constant current $I_r$ from the constant current source 50. The second focusing algorithm is applied to the focusing for the long distance area. In general, in the ratio arithmetic processing $\{I_1/(I_1+I_2)\}$, in the event that the subject is at the long distance, the value of the photo-current $I_2$ particularly representative of the long distance side signal F is small. Thus, a ratio of the long distance side signal F to the noise component to the signal component is large. Consequently, in some case, it happens that there is generated a so-called inversion phenomenon of distance data in which distance data representative of a shorter distance than the actual distance is obtained. For this reason, according to the second focusing algorithm, the ratio arithmetic processing is performed through fixing the photo-current $I_2$ to a predetermined value of constant current $I_r$ so that focusing is adjusted to a slightly long distance side. This makes it possible to expect a higher possibility that a preferable photograph is obtained.

The third focusing algorithm relates to a focusing algorithm of calculating a distance according to the irradiation intensity on the detection surface of the PSD element 30. More in detail, according to the third focusing algorithm, the switch elements 61 and 62 are changed over to the turn-on state and the turn-off state, respectively, and the switch element 63 is changed over to the contact 63b side, so that the first signal transmission path 201 shown in FIG. 6 is selected, and an arithmetic processing $\{(I_1+I_2)/(I_1+I_2+I_r)\}$ based on light quantity of added value (light quantity) of two photo-currents $I_1$ and $I_2$ from the PSD element 30 and the constant current $I_r$ from the constant current source 50 is performed. The third focusing algorithm is applied to the focusing for the longest distance area. In the even that the subject is at the longest distance, the photo-currents $I_1$ and $I_2$ are small in value and thus the ratios of the long distance side signal F to the noise component to the signal component are large. Consequently, it is difficult to obtain distance data up to the subject by the ratio arithmetic processing. For this reason, according to the third focusing algorithm, arithmetic processing based on light quantity involved in addition of photo-currents $I_1$ and $I_2$ is performed. This makes it possible to expect a higher possibility that a preferable photograph is obtained. Also in the event that the arithmetic processing based on light quantity is performed, the AF-dedicated photo detector circuit 40 for performing the ratio arithmetic operation is used.

Figure 9:
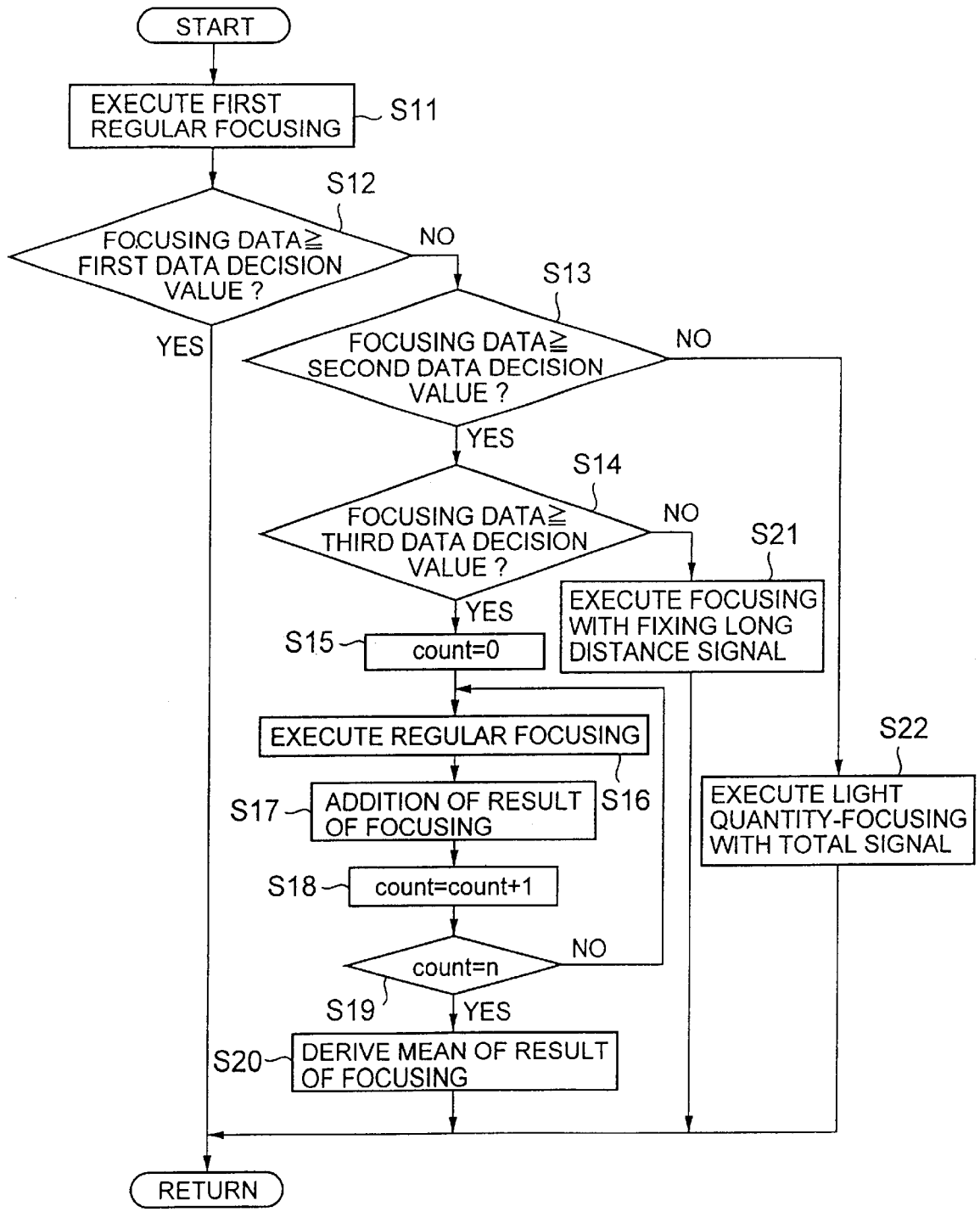
FIG. 9 is a flowchart of a focusing routine of the camera shown in FIG. 1.
Figure 10:
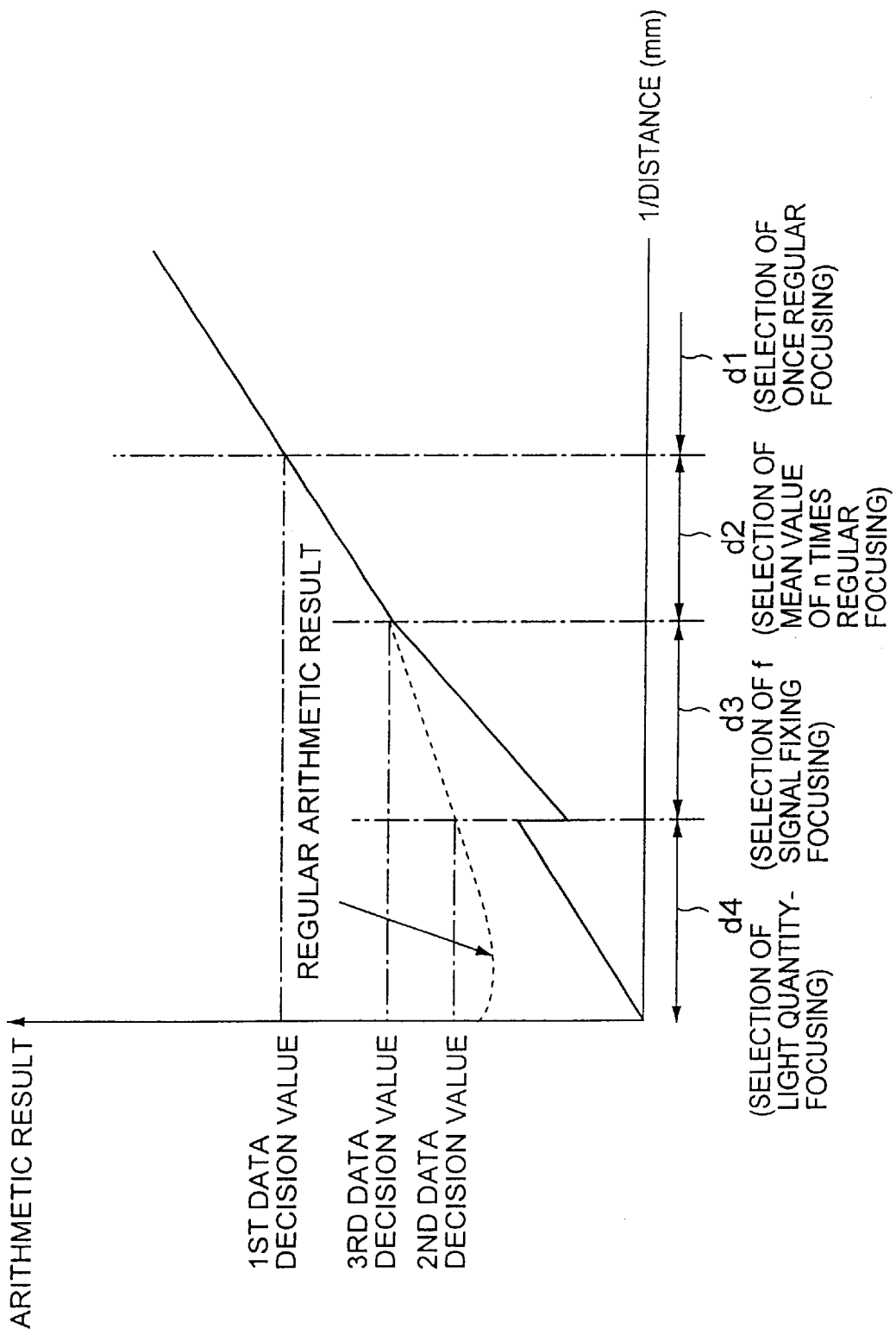
FIG. 10 is a view showing a focusing characteristic of the camera shown in FIG. 1.

FIG. 9 is a flowchart of a focusing routine of the camera shown in FIG. 1. FIG. 10 is a view showing a focusing characteristic of the camera shown in FIG. 1.

The focusing routine shown in FIG. 9 starts when a shutter button is subjected to a half-push operation.

First, in a step S11, the first regular focusing (first focusing of a series of focusing operations for determining a position of a photographic lens once) is carried out. Incidentally, the regular focusing referred to in this flowchart means focusing using the first focusing algorithm. According to the first focusing algorithm, the AF-dedicated photo detector circuit 40 performs the ratio arithmetic processing $\{I_1/(I_1+I_2)\}$ to determine a distance (focusing data) up to the subject.

Next, the process goes to a step S12 in which it is determined whether the focusing data is not less than a first data determination value. The first data determination value is, as shown in FIG. 10, a value which is set up to distinguish the short distance area d1 from the middle distance area d2. When it is determined that the focusing data is not less than the first data determination value (when it is determined that the subject is in the short distance area d1), this routine is passed through. That is, in this case, it means that the series of focusing operation has been completed with only the first regular focusing carried out in the step S11. In this manner, in the short distance area d1 wherein the value of the noise component included in the photo-currents $I_1$ and $I_2$ from the PSD element 30 is relatively small, it is possible to obtain focusing data with greater accuracy through once focusing.

On the other hand, in the step S12, when it is determined that the focusing data is less than the first data determination value, the process goes to a step S13 in which it is determined whether the focusing data is not less than the second data determination value. The second data determination value is a value which is set up to distinguish the longest distance area d4 from the long distance area d3. When it is determined that the focusing data is not less than the second data determination value, it means that the subject is in the long distance area d3 or the middle distance area d2, and thus the process goes to a step S14 in which it is determined whether the focusing data is not less than the third data determination value. The third data determination value is a value which is set up to distinguish the middle distance area d2 from the long distance area d3. When it is determined that the focusing data is not less than the third data determination value, it means that the subject is in the middle distance area d2, and thus the process goes to a step S15.

In the step S15 and the subsequent steps, n times of focusing is carried out in the regular focusing, or the first focusing algorithm. First, in the step S15, a value "count" of a counter for counting a number of times of focusing is set up to '0', and the process goes to step S16 in which the regular focusing, or the first focusing algorithm is used to carry out the focusing. Next, in step S17 the focusing result is added on an accumulation basis and the process goes to step S18. In the step S18 the value "count" of the counter is incremented and the process goes to step S19. In the step S19 it is determined whether the value "count" of the counter reaches the number n of times of focusing. When it is determined that the value "count" of the counter does not reach the number n of times of focusing, the process returns to the step S16. On the other hand, when it is determined that the value "count" of the counter reaches the number n of times of focusing, the process goes to step S20 in which the mean value of the accumulated and added focusing result is derived and the routine is passed through. In this manner, in the middle distance area d2 wherein the value of the noise component included in the photo-currents $I_1$ and $I_2$ from the PSD element 30 is middle or so, n times of focusing is carried out in accordance with the first focusing algorithm, in addition to once focusing in the step S11, to derive the mean value and the mean value is adopted as the focusing data. Thus, it is possible to obtain focusing data with greater accuracy.

In the step S14, when it is determined that the focusing data is less than the third data determination value, it means that the subject is in the long distance area d3, and thus the process goes to step S21 in which a ratio arithmetic processing $\{I_1/(I_1+I_r)\}$ for the photo-current $I_1$ from the PSD element 30 and the constant current $I_r$ from the constant current source 50 is performed in accordance with the second focusing algorithm to determine focusing data up to the subject, and the routine is passed through.

Further, in the above-mentioned step S13, when it is determined that the focusing data is less than the second data determination value, it means that the subject is in the longest distance area d4, and thus the process goes to step S22 in which an arithmetic processing $\{(I_1+I_2)/(I_1+I_2+I_r)\}$ based on light quantity of added value (light quantity) of two photo-currents $I_1$ and $I_2$ from the PSD element 30 and the constant current $I_r$ from the constant current source 50 is performed in accordance with the third focusing algorithm to determine focusing data up to the subject, and the routine is passed through. Generally, in the long distance area d3 and the longest distance area d4, the photo-currents $I_1$ and $I_2$ from the PSD element 30 are small, and thus S/N ratio of signals represented by the photo-currents $I_1$ and $I_2$ is lowered. Here, in the event that focusing data is determined using the first focusing algorithm, as shown with the dotted line in FIG. 10, it happens that there is generated a so-called inversion phenomenon of distance data in which distance data representative of a shorter distance than the actual distance is obtained owing to a noise. According to the present embodiment, as mentioned above, in the long distance area d3, the second focusing algorithm is used to fix the photo-current $I_2$ on the constant current $I_r$ so that the focusing is carried out, and in the longest distance area d4, the third focusing algorithm is used so that the focusing is carried out in accordance with quantity of light. This feature makes it possible to prevent the inversion phenomenon of distance data and thereby obtaining focusing data with greater accuracy. Here, of the characteristic curve shown in FIG. 10, when a portion of the long distance area d3 is bent in the long distance side, focusing is set up to slightly long distance side. This feature makes it possible to expect such an effect that the photographed picture looks like good.

In this manner, according to the camera of the first embodiment as mentioned above, the AF-dedicated photo detector circuit performing the ratio arithmetic operation is utilized to implement the ratio arithmetic processing $\{I_1/(I_1+I_2)\}$ for the short distance area and the middle distance area, the ratio arithmetic processing $\{I_1/(I_1+I_r)\}$ based on the constant current $I_r$ for the long distance area, and the arithmetic processing $\{(I_1+I_2)/(I_1+I_2+I_r)\}$ based on the light quantity for the longest distance area. This feature make it possible to perform effectively focussing with greater accuracy with low cost.

Next, there will be explained cameras according to the second embodiment of the present invention and the subsequent embodiments. The cameras according to the second embodiment of the present invention and the subsequent embodiments are the same as the first embodiment of the present invention explained above except for the following portions, and thus the redundant description will be omitted.

Figure 11:
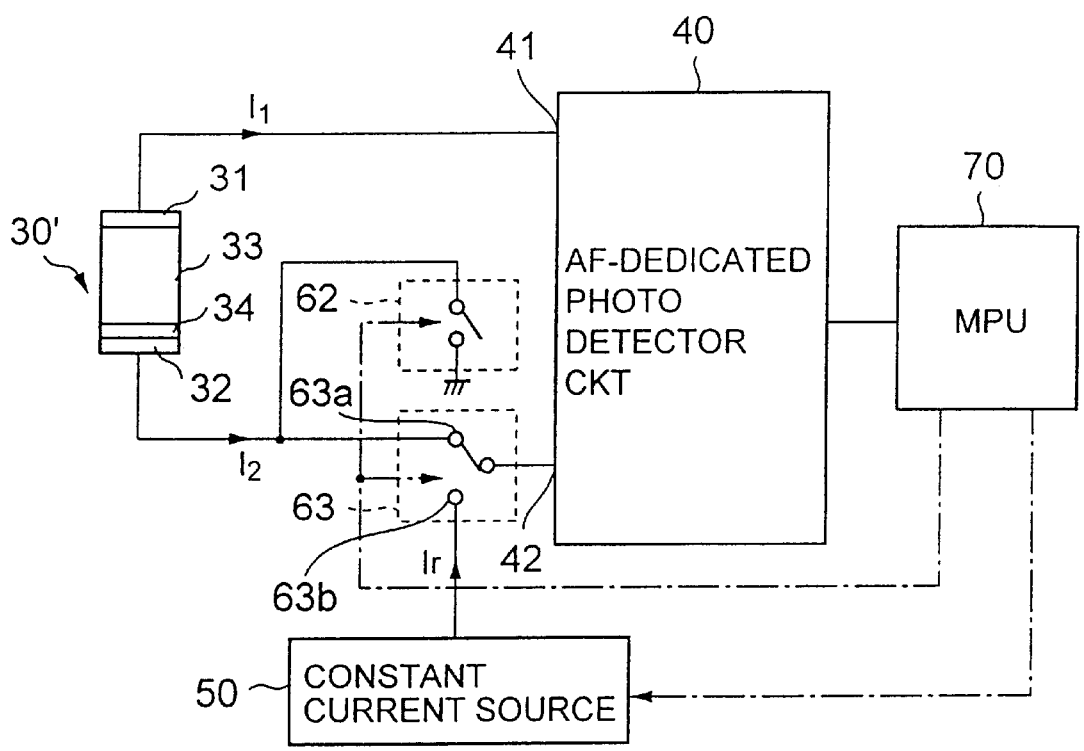
FIG. 11 is a circuit diagram of a photo detector unit of a camera according to the second embodiment of a camera of the present invention.
Figure 12:
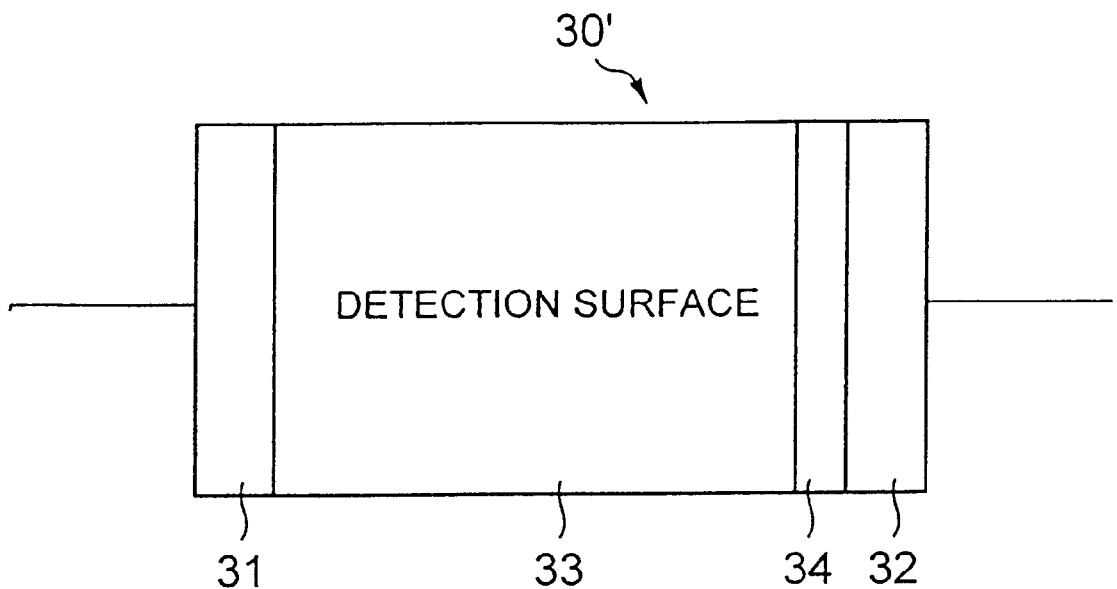
FIG. 12 is a typical illustration of a PSD element shown in FIG. 11.

FIG. 11 is a circuit diagram of a photo detector unit of the camera according to the second embodiment of the present invention. FIG. 12 is a typical illustration of a PSD element shown in FIG. 11.

FIG. 11 shows a PSD element which is different from the PSD element 30 shown in FIG. 4 in structure, as compared with FIG. 4, and in FIG. 11 the switch element 61 shown in FIG. 4 is deleted.

The PSD 30', as shown in FIG. 12, comprises a detection surface 33 for generating a photo-current upon receipt of irradiation of light, a pair of signal electrodes 31 and 32, provided at both ends of the detection surface 33, respectively, for outputting the photo-current generated by irradiation of light onto the detection surface 33 on a shared basis in accordance with the respective distances between an irradiation position of the light on the detection surface 33 and both the ends of the detection surface 33, and a switch 34 (a first switch referred to in the present invention), disposed at a position adjacent to the signal electrode 32 which is one of the pair of signal electrodes 31 and 32, for selectively offering a low impedance state (on state) which permits the photo-current generated on the detection surface 33 to conduct into the signal electrode 32, and a high impedance state (off state) which inhibits the photo-current generated on the detection surface 33 from conducting into the signal electrode 32, in accordance with a control signal from the MPU (cf. FIG. 11).

Figure 13:
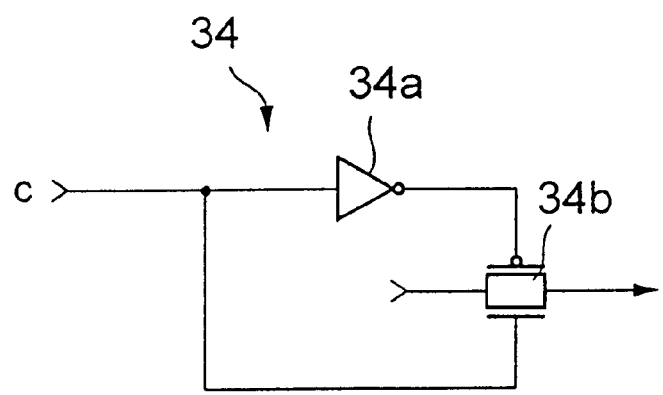
FIG. 13 is a circuit diagram of a switch constituting the PSD element shown in FIGS. 11 and 12 by way of example.

FIG. 13 is a circuit diagram of the switch constituting the PSD element shown in FIGS. 11 and 12 by way of example.

The switch 34 comprises a CMOS inverter 34a to which a control signal C is applied, and a CMOS transfer gate 34b connected to an input and an output of the CMOS inverter 34a. When a 'H' level of voltage is entered as the control signal C, the CMOS transfer gate 34b offers the low impedance state which permits the photo-current generated on the detection surface 33 to conduct into the signal electrode 32. On the other hand, when a 'L' level of voltage is entered as the control signal C, the CMOS transfer gate 34b offers the high impedance state which inhibits the photo-current generated on the detection surface 33 from conducting into the signal electrode 32.

Also in the present embodiment, the flowchart shown in FIG. 9 can be used as it is. Thus, points different from the first embodiment in the flowchart shown in FIG. 9 will be explained in conjunction with FIG. 9 together with FIG. 11.

In the first regular focusing in the step S11 of FIG. 9 and the regular focusing in the step S16, on the condition that the switch 34 is in the turn-on state, the switch element 62 is in the turn-off state, and the switch element 63 is in the state that it is switched to the contact 63a side, so that the second signal transmission path referred to in the present invention is formed, a ratio arithmetic processing $\{I_1/(I_1+I_2)\}$ for the photo-currents $I_1$, $I_2$ from the PSD element 30' is performed.

Further, in the step S21, on the condition that the switch 34 is in the turn-on state, the switch element 62 is also in the turn-on state, and the switch element 63 is in the state that it is switched to the contact 63b side, so that the third signal transmission path referred to in the present invention is formed, a ratio arithmetic processing $\{I_1/(I_1+I_r)\}$ for the photo-current $I_1$ from the signal electrode 31 of the PSD element 30' and the constant current $I_r$ from the constant current source 50 is performed.

Furthermore, in step S22, the switch 34 is change over into the turn-off state. In this state, the total photo-current $(I_1+I_2)$ of two photo-currents $I_1+I_2$, which are outputted from two signal electrodes 31 and 32 when the switch 34 is in the turn-on state, is outputted from the signal electrode 31. And the switch element 63 is changed over at the contact 63b side. The switch element 62 is in the turn-on state or turn-off state, whichever is appropriate. According to the present embodiment, the signal transmission path formed at that time corresponds to the first signal transmission path referred to in the present invention. In the step S22, after the above-mentioned change over, the arithmetic processing $\{(I_1+I_2)/(I_1+I_2+I_r)\}$ based on light quantity is performed.

According to the embodiment shown in FIG. 11, there is adopted the PSD 30' provided with the switch 34. This feature may reduce the number of the corresponding switch elements and contribute to a miniaturization of the device and saving the cost.

Figure 14:
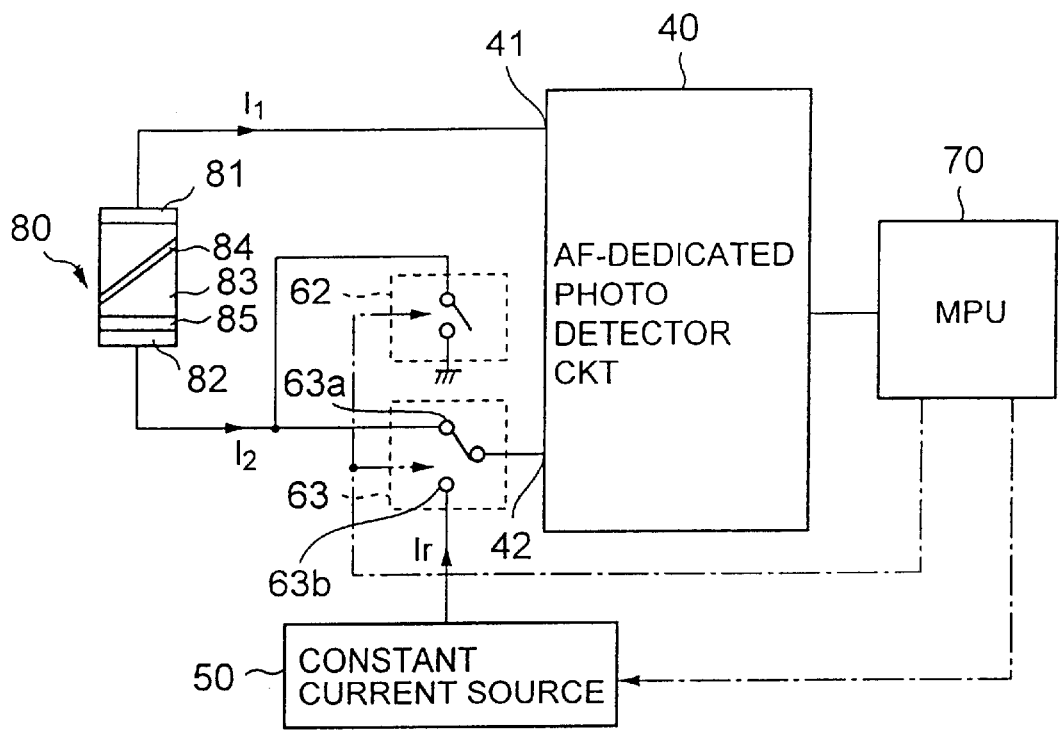
FIG. 14 is a circuit diagram of a photo detector unit of a camera according to the third embodiment of a camera of the present invention.
Figure 15:
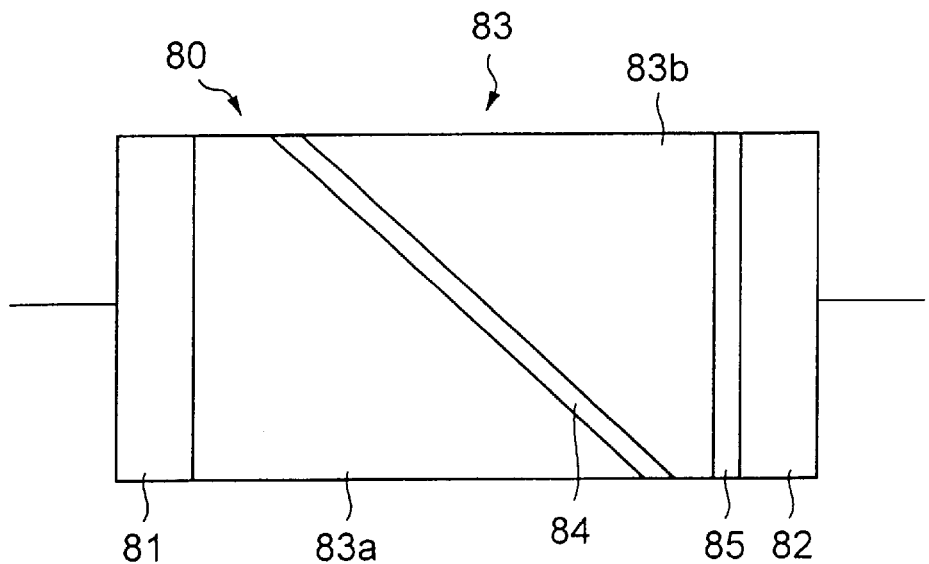
FIG. 15 is a typical illustration of an SPD element shown in FIG. 14.

FIG. 14 is a circuit diagram of a photo detector unit of a camera according to the third embodiment of a camera of the present invention. FIG. 15 is a typical illustration of an SPD element shown in FIG. 14.

In FIG. 14, as compared with FIG. 4, the PSD 30 shown in FIG. 4 is replaced by an SPD 80 which is one of the semiconductor photo detectors. In FIG. 14, in a similar fashion to that of the second embodiment shown in FIG. 11, the switch element 61 shown in FIG. 4 is omitted.

The SPD 80 has, as shown in FIG. 15, a detection surface 83 for generating a photo-current upon receipt of irradiation of light. The detection surface 83 is divided into two parts of divided areas 83a and 83b. Signal electrodes 81 and 82 are provided at both ends of the detection surface 83 in association with the divided areas 83a and 83b, respectively. The signal electrodes 81 and 82 are connected to the divided areas 83a and 83b, respectively, and output the photo-current generated by irradiation of light onto the detection surface 83.

The SPD 80 is provided with a switch 84 (the second switch referred to in the present invention), disposed at a boundary between the divided areas 83a and 83b, for selectively offering a low impedance state (the turn-on state) which permits the photo-current generated on the detection surface 83 to conduct through the boundary, and a high impedance state (the turn-off state) which inhibits the photo-current generated on the detection surface 83 from conducting through the boundary, in accordance with a control signal.

Further, the SPD 80 is provided with a switch 85 (the third switch referred to in the present invention), disposed at a position associated with the signal electrode 82 (corresponding to an example of another signal electrode referred to in the present invention) excepting one signal electrode 81 (corresponding to an example of one signal electrode referred to in the present invention) of the signal electrodes 81 and 82, for selectively offering a low impedance state (the turn-on state) which permits the photo-current generated on the detection surface 83 to conduct into the signal electrode 82, and a high impedance state (the turn-off state) which inhibits the photo-current generated on the detection surface 83 from conducting into the signal electrode 82, in accordance with a control signal from the MPU 70.

Both the two switches 84 and 85 of the SPD 80 shown in FIG. 15 have the same structure as FIG. 13. Thus, the redundant description will be omitted.

Also in the third embodiment, the flowchart shown in FIG. 9 can be adopted as it is. Thus, points different from the first embodiment in the flowchart shown in FIG. 9 will be explained in conjunction with FIG. 14 together with FIG. 9.

In the first regular focusing in the step S11 of FIG. 9 and the regular focusing in the step S16, on the condition that the switch 84 is in the turn-on state, the switch 85 is in the turn-off state, the switch element 62 is in the turn-off state, and the switch element 63 is in the state that it is switched to the contact 63a side, so that the second signal transmission path referred to in the present invention is formed, a ratio arithmetic processing $\{I_1/(I_1+I_2)\}$ for two photo-currents $I_1$, $I_2$ from the SPD element 80 is performed.

Further, in the step S21, on the condition that the switch 84 is in the turn-off state, the switch 85 is in the turn-on state, the switch element 62 is also in the turn-on state, and the switch element 63 is in the state that it is switched to the contact 63b side, so that the third signal transmission path referred to in the present invention is formed, a ratio arithmetic processing $\{I_1/(I_1+I_r)\}$ for the photo-current $I_1$ from the signal electrode 81 of two signal electrodes 81 and 82 of the SPD element 80 and the constant current $I_r$ from the constant current source 50 is performed.

Furthermore, in step S22, the switches 84 and 85 are change over into the turn-on state and the turn-off state, respectively, so that the whole photo-current $(I_1+I_2)$, which are generated by light irradiation onto the photo detector surface 83 of the SPD 80, are outputted from the signal electrode 81. And the switch element 63 is changed over at the contact 63b side. The switch element 62 is in the turn-on state or turn-off state, whichever is appropriate. According to the present embodiment, the signal transmission path formed at that time corresponds to the first signal transmission path referred to in the present invention. In the step S22, after the above-mentioned change over, the arithmetic processing $\{(I_1+I_2)/(I_1+I_2+I_r)\}$ based on light quantity is performed.

In this manner, also the use of the SPD makes it possible to perform the focussing arithmetic operation in a similar fashion to that of the use of the PSD.

Figure 16:
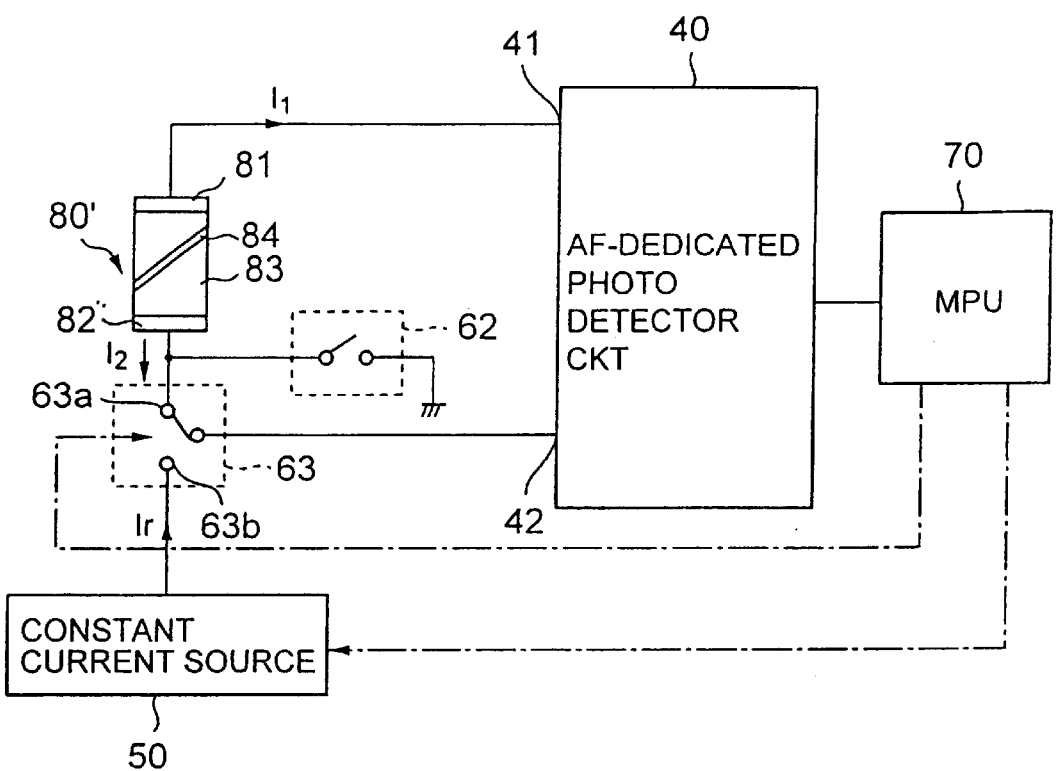
FIG. 16 is a circuit diagram of a photo detector unit of a camera according to the fourth embodiment of a camera of the present invention.

FIG. 16 is a circuit diagram of a photo detector unit of a camera according to the fourth embodiment of a camera of the present invention.

FIG. 16 shows a SPD 80' which is different from the SPD elements 80 shown in FIGS. 14 and 15 in structure, as compared with the circuit diagram of the photo detector unit in the third embodiment shown in FIG. 14, and the two switch elements 62 and 63 shown in FIG. 14 are disposed at the position near the signal electrode 82 of the SPD 80'.

The SPD 80' shown in FIG. 16 is different, as compared with the SPD elements 80 shown in FIGS. 14 and 15, in the point that the SPD 80' shown in FIG. 16 fails to have one switch 85 (corresponding to the third switch referred to in the present invention) of the two switches 84 and 85 constituting the SPD elements 80 shown in FIGS. 14 and 15.

Each of the switch 85 of the SPD elements 80 shown in FIGS. 14 and 15 is a switch for selecting whether the photo-currents $I_1$ and $I_2$ generated by the SPD 80 are outputted from the signal electrodes 81 and 82, respectively, or the total photo-currents $(I_1+I_2)$ are outputted from one electrode 81. The state that the total photo-currents $(I_1+I_2)$ are outputted from one electrode 81 can be implemented in such a manner that the switch element 63 is in a turn-off state and the switch element 62 is changed over at the contact 63b side, also in the event that the SPD 80' shown in FIG. 16, wherein there is not provided the switch 85, is adopted. In this case, however, a large capacity of wiring connected to the signal electrode 82 prevents all the total photo-current $(I_1+I_2)$ from being outputted from the signal electrode 81, and part of the photo-current is outputted from the signal electrode 82 and absorbed by the capacitance of the wiring. Thus an error occurs in focusing. Accordingly, an adoption of the SPD 80' having no switch 85 instead of the SPD 80 having the switch 85, as shown in FIGS. 14 and 15, brings about reduction of costs corresponding to the simple structure in SPD elements. In this case, as one measure of suppressing the focusing error within the allowable range, it is preferable that the switch elements 62 and 63 are disposed extremely in the vicinity of the SPD 80' on the circuit.

Figure 17:
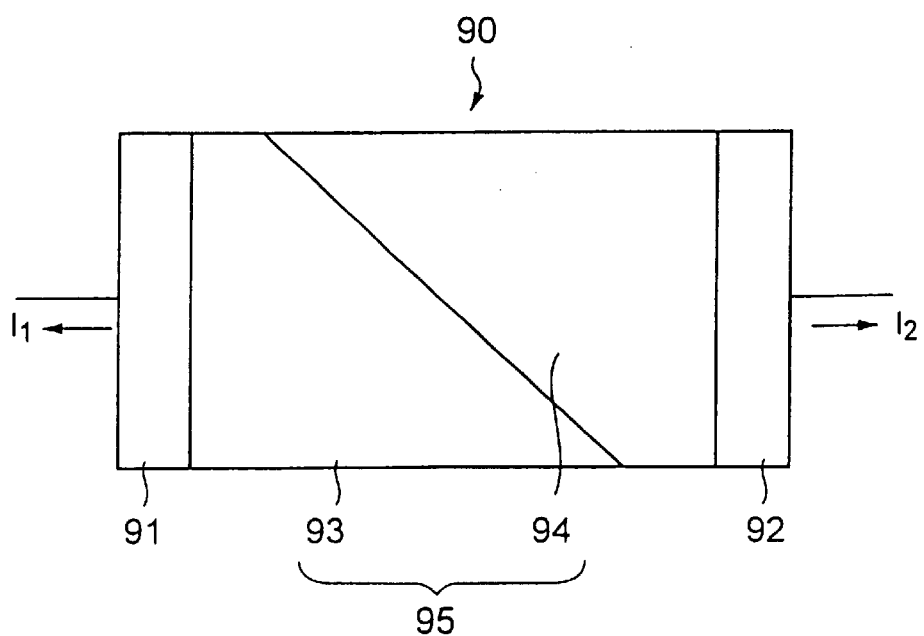
FIG. 17 is a construction view of an SPD element provided in a photo detector unit of a camera according to the fifth embodiment of a camera of the present invention.

FIG. 17 is a construction view of an SPD element provided in a photo detector unit of a camera according to the fifth embodiment of a camera of the present invention.

An SPD element 90 shown in FIG. 17 can be adopted instead of the PSD element 30 shown in FIG. 4 which is adopted in the first embodiment. Thus, as a circuit structure for the fifth embodiment of a camera of the present invention, it is possible to adopt the circuit structure shown in FIG. 4 as it is, except for a replacement of the PSD element 30 by the SPD element 90. Therefore, with respect to the fifth embodiment, there will be explained only the structure of the SPD element 90.

The SPD element 90 shown in FIG. 17 comprises a detection surface 95 for generating a photo-current upon receipt of irradiation of light, said detection surface 95 comprising two divided detection surfaces 93 and 94, and two signal electrodes 91 and 92, connected to the two divided detection surfaces 93 and 94, respectively, for outputting on a share basis the photo-current generated by irradiation of light onto said detection surface 95 in accordance with light quantity of irradiation of light onto the divided detection surfaces 93 and 94.

There is no switch at the boundary between the divided detection surfaces 93 and 94, and the divided detection surfaces 93 and 94 are kept electrically divided.

It is acceptable that such an SPD element 90 is adopted so that a ratio arithmetic procedure is performed by the AF-dedicated photo detector circuit 40 in accordance with photo-currents $I_1$, $I_2$ outputted from the two signal electrodes 91 and 92 of the SPD element 90. Here, while the SPD element has the detection surface comprising two divided detection surfaces, it is acceptable that the detection surface comprises three or more divided detection surfaces. In this case, it is acceptable that a ratio arithmetic procedure is performed by the AF-dedicated photo detector circuit in accordance with photo-currents outputted from any two divided detection surfaces according to the distance range of focusing.

According to the above-mentioned various type of embodiments, the ratio arithmetic procedure of AF-dedicated photo detector circuit 40 is utilized to implement the ratio arithmetic processing $\{I_1/(I_1+I_2)\}$ for the short distance area and the middle distance area, the ratio arithmetic processing $\{I_1/(I_1+I_r)\}$ based on the constant current $I_r$ for the long distance area, and the arithmetic processing $\{(I_1+I_2)/(I_1+I_2+I_r)\}$ based on the light quantity for the longest distance area. This feature make it possible to perform effectively focussing with greater accuracy with low cost.

Further, according to the above-mentioned various type of embodiments, the present invention is explained referring to three signal transmission paths of first, second and third signal transmission paths. However, the present invention is not confined to such three signal transmission paths and any one is acceptable, as the signal transmission path, which is provided with a first signal transmission path wherein the photo-current obtained through irradiation of light onto a detection surface of a semiconductor photo detector is lead to one input terminal of the ratio arithmetic circuit and the fixed current signal from the current source to another input terminal of the ratio arithmetic circuit.

Further, the present invention is not confined to the usual type of camera performing a photography on a roll-like shape of photographic film, but applicable to any type of cameras such as an instant camera in which a film is taken out of the camera while being developed, and an electronic still camera in which an image of a subject is formed on a CCD photo detector array and the image is derived in form of a signal.

As mentioned above, according to the distance measuring equipment and the camera of the present invention, it is possible to perform focusing with greater accuracy, suppressing the cost up.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A distance measuring equipment for measuring a distance up to a target to be measured in distance in such a manner that light is projected and light reflected on the target and returned is detected, said distance measuring equipment comprising:

a semiconductor photo detector element having a detection surface generating a photo-current upon receipt of irradiation of light;

a ratio arithmetic circuit, having two input terminals each for receiving associated one of current signals, for performing a ratio arithmetic operation in accordance with the current signals fed from the two input terminals;

a current source for generating fixed current signal; and a first signal transmission path wherein the photo-current obtained through irradiation of light onto the detection surface of said semiconductor photo detector is lead to one input terminal of the two input terminals of said ratio arithmetic circuit and the fixed current signal from said current source to another input terminal of the two input terminals of said ratio arithmetic circuit.

2. A distance measuring equipment according to claim 1, wherein said current source generates a fixed current signal.

3. A distance measuring equipment according to claim 1, wherein said semiconductor photo detector element comprises a plurality of signal electrodes for outputting on a shared basis the photo-current generated on said detection surface, and said first signal transmission path leads photo-currents outputted on a shared basis from said plurality of signal electrodes to said one input terminal.

4. A distance measuring equipment according to claim 3, wherein said semiconductor photo detector element comprises said detection surface, and a pair of signal electrodes, disposed at both ends of said detection surface, adapted for outputting on a shared basis the photo-current generated by irradiation of light onto said detection surface in accordance with respective distances between an irradiation position on said detection surface and both ends of said detection surface.

5. A distance measuring equipment according to claim 1, wherein said semiconductor photo detector element comprises said detection surface, a pair of signal electrodes, disposed at both ends of said detection surface, adapted for outputting on a shared basis the photo-current generated by irradiation of light onto said detection surface, and a first switch, disposed at a position adjacent to one signal electrode which is one of said pair of signal electrodes, for selectively offering a first state which permits the photo-current generated on said detection surface to conduct into said one signal electrode, and a second state which inhibits the photo-current generated on said detection surface from conducting into said one signal electrode, in accordance with a control signal, and said first signal transmission path leads, when said first switch offers said second state, the photo-current outputted from another signal electrode different from said one signal electrode of said pair of signal electrodes to said one input terminal.

6. A distance measuring equipment according to claim 5, wherein in said semiconductor photo detector element, when said first switch is in the first state, said pair of signal electrodes output on a shared basis the photo-currents generated by irradiation of light onto said detection surface in accordance with respective distances between an irradiation position of the light on said detection surface and both the ends of the detection surface.

7. A distance measuring equipment according to claim 5, wherein said first state is a low impedance state, and said second state is a high impedance state.

8. A distance measuring equipment according to claim 1, wherein said semiconductor photo detector element comprises said detection surface, said detection surface being divided into first and second divided areas, first and second signal electrodes, said first signal electrode connected to the first divided area of said detection surface, and said second signal electrode connected to the second divided area of said detection surface, said first and second signal electrodes adapted for outputting the photo-current generated by irradiation of light onto said detection surface, and a second switch, disposed at a boundary between divided areas of said detection surface, for selectively offering a first state which permits the photo-current generated on said detection surface to conduct through the associated boundary, and a second state which inhibits the photo-current generated on said detection surface from conducting through the associated boundary, in accordance with a control signal, and said first signal transmission path leads, when said second switch offers said first state, the photo-current outputted from the first and second signal electrodes on a shared basis to said one input terminal.

9. A distance measuring equipment according to claim 8, wherein said first state is a low impedance state, and said second state is a high impedance state.

10. A distance measuring equipment according to claim 1, wherein said semiconductor photo detector element comprises said detection surface, said detection surface being divided into first and second divided areas, first and second signal electrodes, said first signal electrode connected to the first divided area of said detection surface and said second signal electrode connected to the second divided area of said detection surface, said first and second electrodes being adapted for outputting the photo-current generated by irradiation of light onto said detection surface, a second switch, disposed at a boundary between divided areas of said detection surface, for selectively offering a first state which permits the photo-current generated on said detection surface to conduct through the associated boundary, and a second state which inhibits the photo-current generated on said detection surface from conducting through the associated boundary, in accordance with a control signal, and a third switch, provided in association with another signal electrode excepting a first signal electrode which is one of said signal electrodes, for selectively offering a first state which permits the photo-current generated on said detection surface to conduct into the associated signal electrode, and a second state which inhibits the photo-current generated on said detection surface from conducting into the associated signal electrode, in accordance with a control signal, and said first signal transmission path leads, when said third switch offers said second state, while said second switch offers said first state, the photo-current outputted from the first signal electrode to said one input terminal.

11. A distance measuring equipment according to claim 8, wherein said first state is a low impedance state, and said second state is a high impedance state.

12. A distance measuring equipment according to claim 1, wherein said semiconductor photo-detector element has a plurality of signal electrodes adapted for outputting on a shared basis the photo-current generated on said detection surface, and distance measuring equipment further comprises a transmission path selecting unit for changing over between said first signal transmission path and a second signal transmission path for leading two types of photo-currents outputted from two signal electrodes of the plurality of signal electrodes of said semiconductor photo detector element to the two input terminals of said ratio arithmetic circuit, respectively.

13. A distance measuring equipment according to claim 1, wherein said semiconductor photo detector element has a plurality of signal electrodes adapted for outputting on a shared basis the photo-current generated on said detection surface, and distance measuring equipment further comprises a transmission path selecting unit for changing over between said first signal transmission path and a second signal transmission path for leading one photo-current of a plurality of photo-currents outputted from the plurality of signal electrodes of said semiconductor photo detector element to one of the two input terminals of said ratio arithmetic circuit, and for leading a fixed current signal from said current source to another input terminal of the two input terminals of said ratio arithmetic circuit.

14. A distance measuring equipment according to claim 1, wherein said semiconductor photo detector element has a plurality of signal electrodes adapted for putting on a shared basis the photo-current generated on said detection surface, and distance measuring equipment further comprises a transmission path selecting unit for changing over between said first signal transmission path, a second signal transmission path for leading two types of photo-currents outputted from two signal electrodes of the plurality of signal electrodes of said semiconductor photo detector element to the two input terminals of said ratio arithmetic circuit, respectively, and a third signal transmission path for leading one photo-current of a plurality of photo-currents outputted from the plurality of signal electrodes of said semiconductor photo detector element to one of the two input terminals of said ratio arithmetic circuit, and for leading a fixed current signal from said current source to another input terminal of the two input terminals of said ratio arithmetic circuit.

15. A camera having a distance measuring equipment for projecting light for focusing in front of the camera and detecting light reflected on a subject to determine a distance up to the subject, said distance measuring equipment moving an image taking lens to the determined distance for photography, wherein said distance measuring equipment comprises:

- a semiconductor photo detector element having a detection surface generating a photo-current upon receipt of irradiation of light;
- a ratio arithmetic circuit, having two input terminals each for receiving associated one of current signals, for performing a ratio arithmetic operation in accordance with the current signals fed from the two input terminals;
- a current source for generating fixed current signal; and
- a first signal transmission path wherein the photo-current through irradation of light onto the detection surface of said semiconductor photo detector is lead to one input terminal of the two input terminals of said ratio arithmetic circuit and the fixed current signal from said current source to another input terminal of the two input terminals of said ratio arithmetic circuit.

16. A camera according to claim 15, wherein said semiconductor photo detector element has a plurality of signal electrodes adapted for outputting on a shared basis the photo-current generated on said detection surface, and distance measuring equipment further comprises a transmission path selecting unit for changing over between said first signal transmission path and a second signal transmission path for leading two types of photo-currents outputted from two signal electrodes of the plurality of signal electrodes of said semiconductor photo detector element to the two input terminals of said ratio arithmetic circuit, respectively.

17. A camera according to claim 15, wherein said semiconductor photo detector element has a plurality of signal electrodes adapted for outputting on a shared basis the photo-current generated on said detection surface, and distance measuring equipment further comprises a transmission path selecting unit for changing over between said first signal transmission path and a second signal transmission path for leading one photo-current of a plurality of photo-currents outputted from the plurality of signal electrodes of said semiconductor photo detector element to one of the two input terminals of said ratio arithmetic circuit, and for leading a fixed current signal from said current source to another input terminal of the two input terminals of said ratio arithmetic circuit.

18. A camera according to claim 15, wherein said semiconductor photo detector element has a plurality of signal electrodes adapted for outputting on a shared basis the photo-current generated on said detection surface, and distance measuring equipment further comprises a transmission path selecting unit for changing over between said first signal transmission path, a second signal transmission path for leading two types of photo-currents outputted from two signal electrodes of the plurality of signal electrodes of said semiconductor photo detector element to the two input terminals of said ratio arithmetic circuit, respectively, and a third signal transmission path for leading one photo-current of a plurality of photo-currents outputted from the plurality of signal electrodes of said semiconductor photo detector element to one of the two input terminals of said ratio arithmetic circuit, and for leading a fixed current signal from said current source to another input terminal of the two input terminals of said ratio arithmetic circuit.

* * * * *